UNITED STATES PATENT OFFICE.

WILLIAM H. KEERAN, OF FORT WAYNE, INDIANA, ASSIGNOR OF ONE-HALF TO MELVILLE A. MASON, OF SAME PLACE.

WRITING-SURFACE FOR BLACKBOARDS OR SLATES.

SPECIFICATION forming part of Letters Patent No. 633,551, dated September 19, 1899.

Application filed April 3, 1896. Serial No. 586,118. (No model.)

*To all whom it may concern:*

Be it known that I, WILLIAM H. KEERAN, a citizen of the United States, residing at the city of Fort Wayne, in the county of Allen and State of Indiana, have invented certain new and useful Improvements in Writing-Surfaces Designed for Use as Blackboards or Slates; and I do hereby declare that the following is a full, clear, and exact description of the invention, which will enable others skilled in the art to which it appertains to make and use the same.

The object of this invention is to produce a cheap, simple, and efficacious sheet of material for blackboards and slates that shall to some extent be resilient and be provided with a surface that will withstand wear and be as smooth and easily operated upon as a finished slate-surface and not be easily broken.

The peculiar features and qualities of the articles of manufacture above named will be better understood by a brief description of the manner of making the same. Rubber suitably prepared for vulcanizing and known as "hard-rubber compound" is rolled out in thin sheets of the width and length desired by being passed between rollers in the usual manner in the manufacturing of hard-rubber goods. The sheet is then laid on an iron table, and emery in fine division is thinly and uniformly distributed on its surface, the sheet being kept warm to retain the emery. All superfluous emery which does not adhere is then brushed carefully off, leaving a thin layer or dusting of emery upon the sheet, very uniformly distributed. Then a sheet of pure tin or tin-foil of very smooth surface is laid over and upon it, and the whole is subjected to a heavy pressure to thoroughly impact the thin dusting or coating of emery into the surface of the rubber sheet and produce a smooth even compressed surface before curing. The sheet is then vulcanized in the usual manner of vulcanizing hard-rubber goods, whereby the impacted coating is incorporated into the surface of the sheet, producing a hard-rubber sheet having an exceedingly hard smooth surface of very uniform texture, formed of rubber and emery, equal to the surface of a finished slate and having a body or backing of hard rubber retaining fully the resiliency and hardness of hard rubber without any sponginess or elasticity.

The method described of impacting the emery coating into the surface of the sheet is the preferred one, because it is the best, as well as the most economical. The essential of this is that the coating must be impacted into the surface of the sheet under a smooth metallic surface, giving it a smooth, even, and compressed surface before curing.

The writing-tablet thus formed is resilient but not elastic, is not easily broken, is comparatively light and portable, and will take a pencil or chalk mark as economically and readily as a finished slate and be practicably indestructible by such use. The sheet can be made originally the size wanted or it can be made larger and cut into such sizes as may be desired.

I am aware of the issuing of Letters Patent of the United States Nos. 27,817 and 91,458 and also of issue of English patent to Caillet, No. 17,417, of 1888; but I do not claim as my invention anything shown or described in either of said patents. Neither do I claim, broadly, a compound of hard rubber and emery or other gritty material incorporated with each other; but What I do claim, and desire to secure by Letters Patent, is—

1. As a new article of manufacture, a writing-surface consisting of a sheet of hard rubber having a thin coating of emery or similar substance impacted and incorporated in its surface, and having a hard, smooth and uniform slate-like surface: the body of the sheet retaining the resiliency and non-elasticity of hard rubber.

2. The process of manufacturing writing-surfaces which consists in applying a thin coating of emery or similar substance evenly and uniformly upon the surface of a sheet of hard-rubber compound; then impacting the same into the said surface by pressure under a metallic sheet of smooth and uniform surface placed upon said sheet: and then vulcanizing the same, retaining the metallic sheet thereon during the process.

3. A new article of manufacture for blackboards and writing-surfaces, consisting of vulcanized rubber in sheets provided with a slated or emery writing-surface affixed thereon.

In witness whereof I hereunto subscribe my name, in the presence of two witnesses, this 1st day of April, 1896.

WILLIAM H. KEERAN.

Witnesses:
B. D. ANGELL,
H. C. HARTMAN.